(12) United States Patent
Heine et al.

(10) Patent No.: US 8,403,200 B2
(45) Date of Patent: Mar. 26, 2013

(54) DEVICE FOR SUPPLYING AN INERT GAS TO A WAVE SOLDERING INSTALLATION

(75) Inventors: Fernand Heine, Amay (BE); Marc Leturmy, Gressey (FR)

(73) Assignee: L'Air Liquide Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 13/393,414

(22) PCT Filed: Aug. 24, 2010

(86) PCT No.: PCT/EP2010/062355
§ 371 (c)(1),
(2), (4) Date: Mar. 7, 2012

(87) PCT Pub. No.: WO2011/026761
PCT Pub. Date: Mar. 10, 2011

(65) Prior Publication Data
US 2012/0160898 A1    Jun. 28, 2012

(30) Foreign Application Priority Data
Sep. 2, 2009  (DE) .................. 20 2009 011 875 U

(51) Int. Cl.
*B23K 1/08* (2006.01)
*B23K 1/00* (2006.01)
(52) U.S. Cl. .......................................... 228/37; 228/42

(58) Field of Classification Search .................. 228/260, 228/259, 37, 42, 56.1, 56.2
See application file for complete search history.

(56) References Cited

U.S. PATENT DOCUMENTS

| | | | |
|---|---|---|---|
| 2,581,744 A * | 1/1952 | Zimmerman | .................. 165/62 |
| 4,546,228 A | 10/1985 | Bonhomme | |
| 5,769,305 A | 6/1998 | Takeda et al. | |
| 6,305,596 B1 * | 10/2001 | Lin et al. | ....................... 228/125 |
| 2010/0276475 A1 * | 11/2010 | Leturmy et al. | ............... 228/259 |

FOREIGN PATENT DOCUMENTS

| | | |
|---|---|---|
| WO | WO 92/10323 | 6/1992 |
| WO | WO 2005/115669 | 12/2005 |
| WO | WO 2007/138310 | 12/2007 |

OTHER PUBLICATIONS

International Search Report, PCT/EP2010/062355, Dec. 15, 2010.

* cited by examiner

*Primary Examiner* — Kiley Stoner
*Assistant Examiner* — Carlos Gamino
(74) *Attorney, Agent, or Firm* — Elwood L. Haynes

(57) ABSTRACT

The invention relates to a device for supplying inert gas in order to protect the surface of a solder bath in a wave soldering installation and the components to be soldered against oxidation. Wave soldering installations form solder waves over which parts to be soldered are transported. The parts to be soldered are generally electronic printed circuit boards which have electronic components soldered onto their undersides by the solder wave making contact with the printed circuit board.

11 Claims, 3 Drawing Sheets

DEVICE FOR SUPPLYING AN INERT GAS TO A WAVE SOLDERING INSTALLATION

CROSS-REFERENCE TO RELATED APPLICATIONS

This application is a §371 of International PCT Application PCT/EP2010/062355, filed Aug. 24, 2010, which claims priority under 35U.S.C. §119 (a) to German Application No. 20 2009 011 875.4, filed Sep. 2, 2009, the entire contents of which are incorporated herein by reference.

BACKGROUND

Field of the Invention

The invention relates to a device for supplying inert gas in order to protect the surface of a solder bath in a wave soldering installation and the components to be soldered against oxidation. Wave soldering installations form solder waves over which parts to be soldered are transported. The parts to be soldered are generally electronic printed circuit boards which have electronic components soldered onto their undersides by the solder wave making contact with the printed circuit board.

SUMMARY OF THE INVENTION

Wave soldering installations of this type are known from the prior art. By way of example, WO 92/10323 A1 describes a wave soldering installation in which a conveying device is used to guide electronic printed circuit boards to be soldered over the solder bath and the underside of these printed circuit boards is exposed to at least one solder wave. In the region of the solder bath, the conveying device is covered by an immersion box which is immersed in the solder bath in a downward direction with a sealing skirt. A nitrogen atmosphere is maintained in the protected space produced in this way, and this protects the solder bath and the printed circuit boards against the entry of atmospheric oxygen. The nitrogen flows out of porous pipes which are arranged transversely to the conveying direction of the printed circuit boards in the immersion box. Since the nitrogen passed through the pipes is approximately at ambient temperature and is heated at most to 100° C. by coming into direct contact with the solder bath, certain disadvantages arise during operation. By way of example, solid solder may form from solder splashes on the pipes cooled by the nitrogen, and it may be necessary to remove this solder from time to time.

Since, in the case of new soldering processes, components already fitted to the undersides of electronic printed circuit boards are covered with protective masks, the solder waves have to be more pronounced than in the case of conventional processes in order to reach all the points to be soldered between the masks. Higher solder waves are achieved, for example, by increasing the pumping power. When they hit the surface of the solder bath, the high solder waves produce splashes which, over time, result in a layer of solidified solder on the cooler, porous pipes, as a result of which these pipes may become blocked. Furthermore, the relatively cool nitrogen flows to the region between two solder waves and brings about a brief reduction in the solder temperature to below the solidus temperature of the solder. This brief cooling of the solder can, in turn, have an adverse effect on the quality of the solder.

U.S. Pat. No. 5,769,305 discloses a wave soldering installation in which an inert gas is supplied via an inert gas feed line through a solder bath to a wave soldering region. The inert gas feed line is provided from above through a cover and through the solder bath to a gas distribution unit. The inert gas feed line is connected to the gas distribution unit, in particular underneath the cover. However, the length of the inert gas feed line immersed in the solder bath is not sufficient to significantly increase the temperature of the inert gas while it is being passed through the inert gas feed line immersed in the solder bath.

It is an object of the invention to solve at least some of the problems outlined with reference to the prior art and, in particular, to provide a device which makes it possible to supply an inert gas in a simple manner, virtually at the temperature of a solder bath, to the region above the surface of the solder bath in a wave soldering installation. This may involve different types of soldering installations, as are used for different soldering tasks. The manner in which the inert gas is distributed in the wave soldering installation or the nature of the structures above the solder bath is not particularly important. In particular, the invention also relates to improving the inerting process and avoiding the deposition of solidified solder, in particular in the case of solder baths comprising lead-free solder, which is processed at relatively high temperatures.

This object is achieved by a device having the features of claim 1. The dependent claims relate to advantageous developments. It should be pointed out that the features indicated individually in the dependent claims can be combined with one another in any desired, technologically meaningful way and define further refinements of the invention. In addition, the features indicated in the claims are specified and explained in more detail in the description, with further preferred refinements of the invention being shown.

According to the invention, this object is achieved by a device for supplying inert gas in order to protect the surface of a solder bath in a wave soldering installation against oxidation, said device being in the form of a cover which can be arranged above at least one partial region of the solder bath, wherein at least two heat exchangers which are immersed in the solder bath are fitted underneath the cover, and each of these heat exchangers has an inlet, through which the inert gas is fed in, and an outlet above the cover, wherein heat-resistant, releasable connecting elements can be used to connect the outlets above the cover to at least two inert gas connections of the wave soldering installation.

The solder bath in a wave soldering installation is largely covered by a transporting device which conveys parts to be soldered over solder waves. Therefore, only partial regions of the solder bath are accessible. The cover is adapted for such a partial region and has a shape which corresponds to the partial region.

The heat exchangers, which may have different embodiments, are arranged on the underside of the cover. The heat exchanger may have a plate, which is immersed in the solder bath, or may be formed by pipes formed with ribs. The heat exchanger may also be produced from pipes which, for example, have a meandering configuration. In any case, the inert gas is passed through at least one partial region of the heat exchanger and thus heated, during operation, by the thermal energy of the solder bath.

Simple connection to a gas feed line and to the inert gas connections of a wave soldering installation is made possible by the arrangement, according to the invention, of the inlets and outlets on the upper side of the cover.

Since plug-type connections and plastics-based connecting elements do not work under the high temperatures present at the outlets, use is made, in particular, of screwable, metallic connecting elements. Other connecting elements that are simple to release can be used at the inlets on account of the low temperature which prevails there. The releasable connecting elements make simple handling possible during maintenance of the device.

The inert gas which, during operation, is heated only by the thermal energy of the solder bath, without additional heating elements, heats inert gas supply lines of a wave soldering installation virtually to the temperature of the solder bath and thereby prevents the solder from solidifying on the supply lines and distribution devices for the inert gas. In addition, the heated inert gas supplied to a wave soldering region preheats the parts to be soldered before the first solder wave and prevents cooling of the parts to be soldered between two solder waves. In addition, the heated inert gas prevents the solder deposited on the components from solidifying between two solder waves. A further advantage is that the heating expands the inert gas and therefore less inert gas is required, or improved inerting of an identical spatial volume is possible. This has particular advantages when soldering printed circuit boards which are already equipped with covered components on the underside and are therefore guided at a distance from the surface of the solder bath and over particularly high solder waves.

According to a further expedient embodiment, the at least two heat exchangers are designed and dimensioned in such a manner that they can be immersed substantially completely in the solder bath next to other components of the wave soldering installation. The arrangement of the device next to other components of the wave soldering installation makes it possible to use the device together with an existing wave soldering installation and to carry out separate maintenance for the different components. Since the device does not have a complex design, it is a low-cost addition to existing wave soldering installations.

According to a further aspect of the invention, in which a wave soldering installation has a transport device for parts to be soldered with a direction of movement, a device is proposed in which the greatest dimension of the heat exchangers together is in the direction of movement. The greatest dimension of a wave soldering installation is in the direction of movement, and accordingly the overall length of the heat exchangers is also at its greatest in this direction.

The smallest dimension of the heat exchangers is preferably transverse to the direction of movement and does not exceed a width of 5 cm, preferably 2.5 cm. Such a small width makes a compact design possible and therefore provides for simple integration in an existing wave soldering installation.

In a further embodiment, at least three heat exchangers are present. The number of heat exchangers in the device is advantageously the same as the number of inert gas connections of a wave soldering installation. If there are more heat exchangers than inert gas connections of the wave soldering installation, the at least one additional heat exchanger may serve as a replacement, in case a heat exchanger in use fails.

In a particularly preferred embodiment, the heat exchangers are in the form of pipe coils. A pipe coil is understood to mean a pipe shaped in any desired way. A pipe in the form of a heat exchanger makes effective heat exchange possible since the gas is separated from the solder bath only by a pipe wall which readily conducts heat. The pipes are preferably formed from stainless steel.

In a further particularly preferred embodiment, the pipe coils describe at least 1.5 windings within the solder bath. The windings advantageously extend about an axis perpendicular to the direction of movement. According to the invention, the heat exchangers thus make it possible to efficiently take up heat of the inert gas in the smallest possible space.

In a preferred embodiment, the cover can be detached when the inlets and outlets are not connected. This means, in particular, that the cover can be removed completely, since complete removal of the device from the wave soldering installation is advantageous for simple maintenance.

In order to improve the device, it is advantageous if the heat exchangers consist of a material that is resistant to the solder bath or are coated with such a material. Naturally, solder attacks many materials. A material which prevents such an attack increases the service life of the heat exchangers. The heat exchanger is preferably coated with titanium nitride or with chromium nitride.

Independently of the present invention, a coating of components which process solder, or are permanently in contact with it, is generally advantageous for durability. Titanium nitride and/or chromium nitride, in particular, provide effective protection and can increase the durability of metallic components in a solder bath.

The text which follows also describes a process for supplying inert gas in order to protect the surface of a solder bath in a wave soldering installation against oxidation, wherein the inert gas is supplied from above through the cover to a heat exchanger immersed in the solder bath underneath a cover, is heated by the heat exchanger and is supplied back to the top through the cover and to the wave soldering installation.

The heated inert gas is supplied to a wave soldering region in the wave soldering installation and thereby protects the surface of the solder bath against oxidation and also prevents cooling of parts to be soldered between two solder waves.

In an advantageous development of the process according to the invention, the inert gas is supplied to the wave soldering installation through at least two separate inlets and through at least two separate heat exchangers and at least two separate outlets, preferably through three separate inlets, heat exchangers and outlets. Inert gas is advantageously heated and supplied to the wave soldering installation by the same number of heat exchangers as there are inert gas connections of the wave soldering installation. Since inexpensive, reliable flowmeters are used to set the different inert gas flows, and it must be possible to operate control valves, the inert gas flows are distributed at ambient temperature. The separate partial inert gas flows are then heated according to the invention.

In a further advantageous development, the solder bath is at a temperature of between 100° C. and 500° C., preferably between 240° C. and 300° C., the inert gas is at a temperature of between 5° C. and 40° C. before it is supplied and is increased to a temperature of between 80° C. and 480° C., preferably between 180° C. and 280° C., by the heat exchanger or heat exchangers. The inert gas is therefore virtually at the temperature of the solder bath and thereby prevents the solidification of solder on distribution devices within the wave soldering installation and cooling of parts to be soldered between two solder waves. The preferred temperatures prevail, in particular, when using lead-free solders, which are increasingly being used.

BRIEF DESCRIPTION OF THE FIGURES

In the text which follows, the invention and the technical field will be explained in more detail with reference to the figures. It should be pointed out that the figures show particularly preferred embodiment variants of the invention, but the invention is not restricted to these.

DETAILED DESCRIPTION OF THE INVENTION

Figure 1:
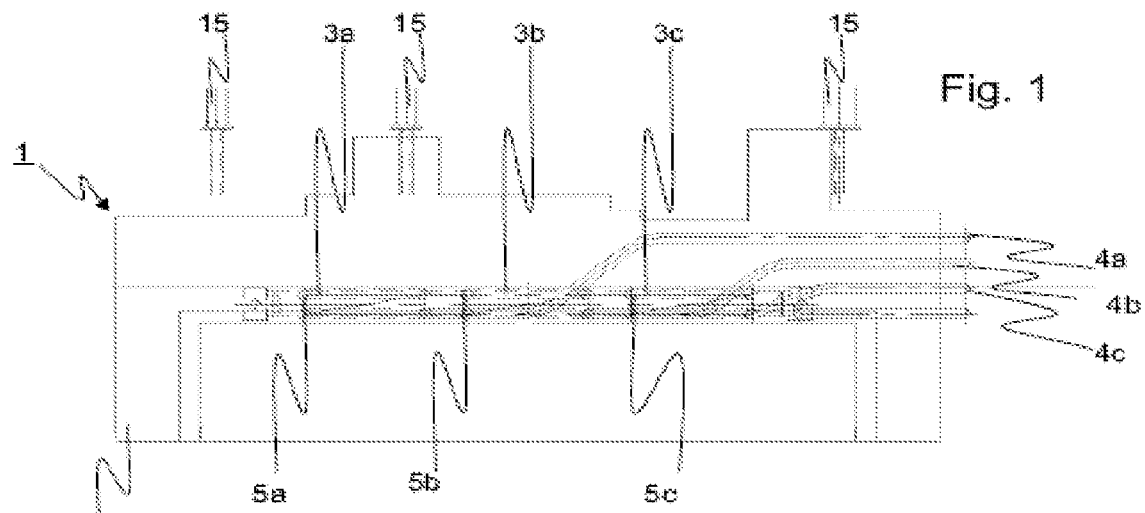
FIG. 1: schematically shows a plan view of a device according to the invention.
Figure 2:
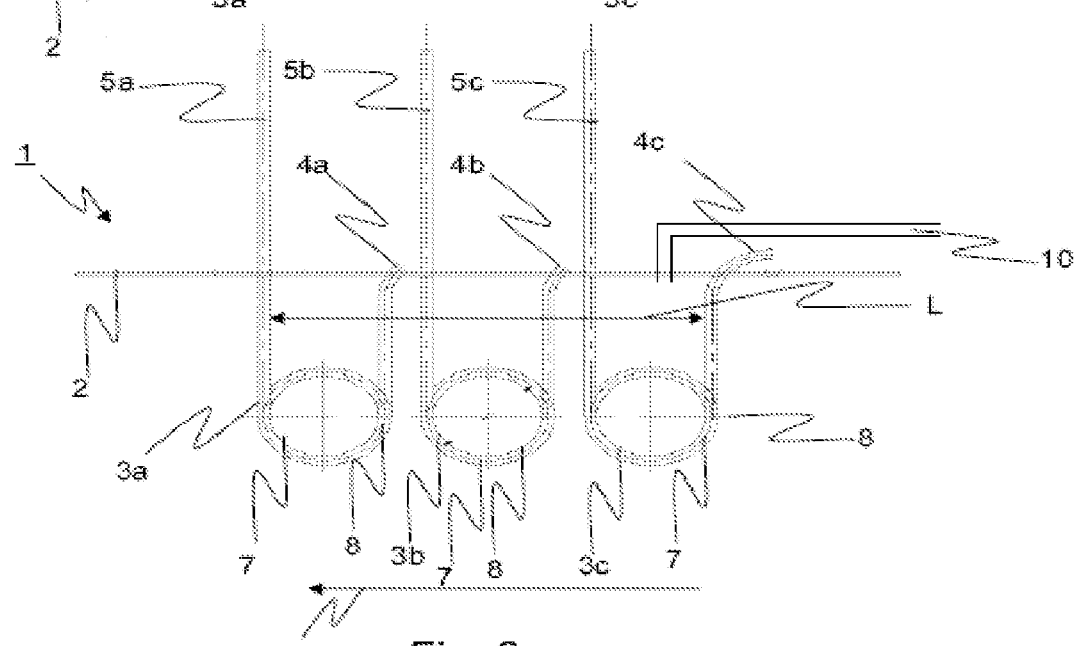
FIG. 2: schematically shows a side view of a device according to the invention.

FIG. 1 shows a schematic plan view, and FIG. 2 shows a schematic side view, of an embodiment of a device 1 according to the invention. The device 1, which is illustrated together with a wave soldering installation 11, comprises a cover 2 and heat exchangers 3a; 3b; 3c arranged underneath the cover 2. The heat exchangers 3a; 3b; 3c each have an inlet 4a; 4b; 4c and an outlet 5a; 5b; 5c on the upper side of the cover 2. On the underside of the cover 2, the heat exchangers 3a; 3b; 3c describe windings 8 which, in this exemplary embodiment, are in the form of pipe coils 7.

In the exemplary embodiment illustrated here, the heat exchangers 3a; 3b; 3c describe about 1.75 windings 8 underneath the cover 2. As much of the surface of the pipe coils 7 as possible is thereby accommodated in the smallest possible space. An arrow marks a direction of movement B of parts 18 to be soldered through the wave soldering installation 11. The greatest overall dimension L of the heat exchangers 3a; 3b; 3c is in the direction of movement B. The device 1 is connected to the inert gas connections 15 of a wave soldering installation 11 via connecting elements 6.

Figure 3:
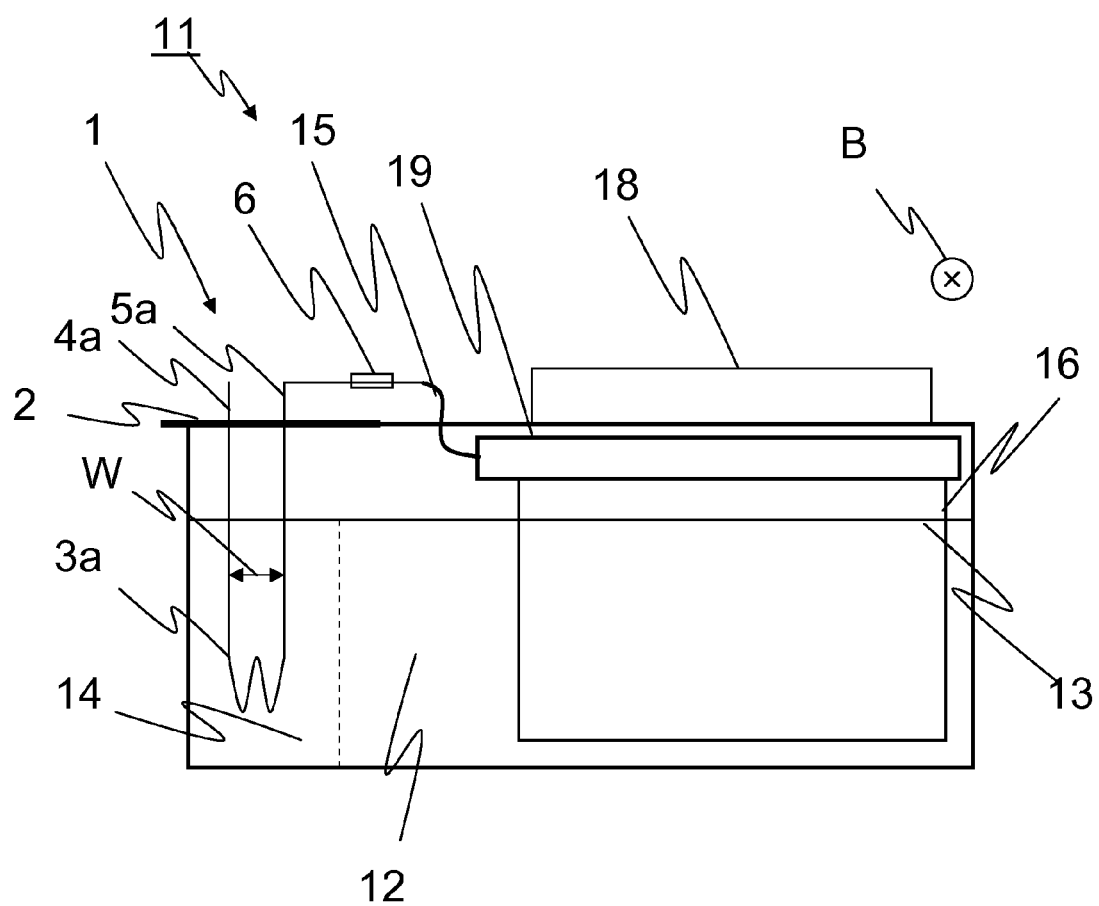
FIG. 3: shows, in a schematic view from the front, the positioning of a device according to the invention in a wave soldering installation.

FIG. 3 shows, in a schematic view from the front, an embodiment of the device 1 according to the invention which is ready for operation in combination with the wave soldering installation 11. The cover 2 of the device 1 is located above a partial region 14 of a solder bath 12 with a surface 13. For reasons of perspective, the illustration shows only one heat exchanger, but the embodiment has three heat exchangers 3a; 3b; 3c. The heat exchanger 3a shown has an inlet 4a and an outlet 5a above the cover 2 and is immersed in the solder bath 12. The outlet 5a is connected to an inert gas connection 15 of the wave soldering installation 11 via a heat-resistant, preferably metallic connecting element 6. The wave soldering installation 11 additionally contains a transport device 17 which transports electronic printed circuit boards 18 in a direction of movement B, which is directed into the plane of the drawing, over the solder bath 12 and solder waves (not shown). Other components 16, for example means for producing the solder wave, are arranged underneath the transport device 17. All the heat exchangers have a very compact design and the smallest dimension W of these heat exchangers is transverse to the direction of movement B, and therefore the device 1 can be integrated in a wave soldering installation 11 in a simple manner. In addition, the device 1 has an inert gas inflow 10, which can be used to render the region underneath the cover and above the solder bath inert with an inert gas, preferably at a flow rate of about 1 m3/h of inert gas.

The arrangement of the inlets 3a and outlets 4a above the cover makes simple handling of the device 1 possible in terms of assembly and maintenance.

During operation, inert gas is supplied to the heat exchanger 3a via the inlet 4a and heated by the thermal energy of the solder bath 12. The heated inert gas is supplied to the wave soldering installation 11 via the outlet 5a and the inert gas connection 15. The heated inert gas is supplied to a wave soldering region in the wave soldering installation 11, where it protects the surface 13 of the solder bath 12 against oxidation. Furthermore, the heated inert gas ensures that the electronic printed circuit boards 18 do not cool in the region between two solder waves and that no solder solidifies on devices for distributing the inert gas. About 6 m3/h of inert gas typically flow through each heat exchanger.

Figure 4:
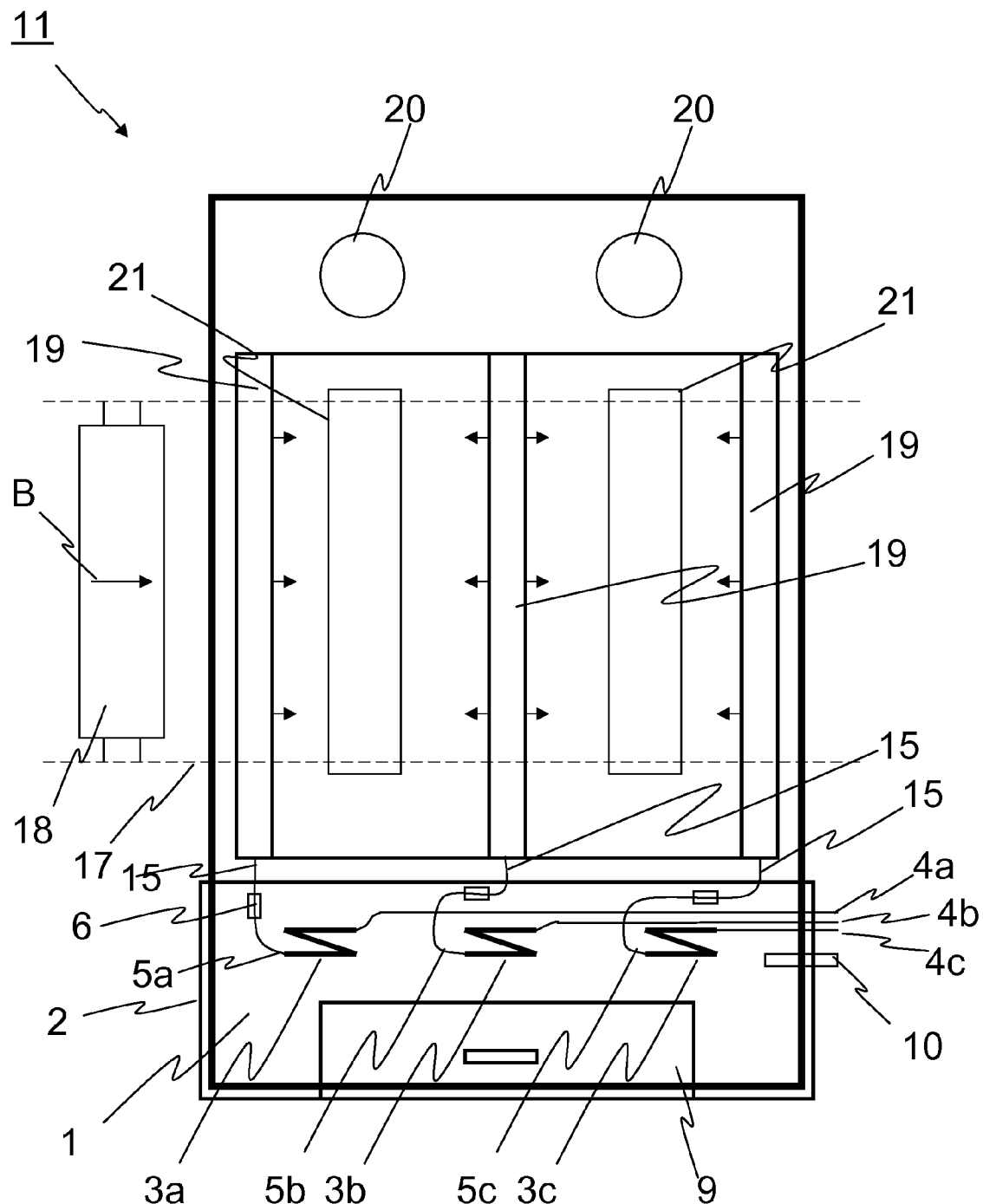
FIG. 4: shows, in a schematic plan view, the positioning of a device according to the invention in a wave soldering installation.

FIG. 4 shows a plan view of a wave soldering installation 11 with an operationally ready device 1 according to the invention. The reference symbols match those in the other figures and the text which follows deals only with the special features of the embodiment illustrated in this figure.

The device according to the invention has three heat exchangers 3a; 3b; 3c with inlets 4a; 4b; 4c and outlets 5a; 5b; 5c. The cover 2 contains a flap 9 which makes it possible to clean the solder bath 12, in particular to remove dross and solidified solder, during operation. The flap 9 may also be in the form of a detachable part of the cover 2. The device 1 also comprises an inert gas inflow 10 through which inert gas can be supplied to the region between the solder bath 12 and the cover 2.

The wave soldering installation 11 is equipped with pumps 20. The pumps 20 produce solder waves 21 over which electronic printed circuit boards 18 are guided using the transport device 17. During operation, the region in front of, between and behind the solder waves 21 is supplied with heated inert gas via the inert gas connections 15 and the porous pipes 19.

The device is distinguished in that it heats the inert gas virtually to the temperature of the solder bath without additional external heating elements, and thus preheats parts to be soldered before a first solder wave and reduces the solidification of the solder in the solder bath. The invention can display its advantages particularly when lead-free solder is used and when soldering printed circuit boards which are equipped with components on both sides.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

LIST OF REFERENCE SYMBOLS

1 Device
2 Cover
3a, 3b, 3c, . . . . Heat exchanger
4a, 4b, 4c, . . . . Inlet
5a, 5b, 5c, . . . . Outlet
6 Connecting element
7 Pipe coil
8 Windings
9 Flap
10 Inert gas inflow
11 Wave soldering installation
12 Solder bath
13 Surface
14 Partial region of the solder bath
15 Inert gas connections
16 Other component
17 Transport device
18 Electronic printed circuit boards 19 Porous pipes
20 Pump
21 Solder wave
B Direction of movement
L Greatest overall dimension (length)
W Smallest dimension (width)

What is claimed is:

1. A device for supplying inert gas in order to protect the surface of a solder bath in a wave soldering installation against oxidation, said device comprising:
   a cover arranged above at least one partial region of the solder bath,
   wherein at least two heat exchangers which are immersed in the solder bath are fitted underneath the cover, and
   each of these heat exchangers has an inlet, through which the inert gas is fed, and an outlet above the cover,
   wherein heat-resistant, releasable connecting elements are configured to connect the outlets above the cover to at least two inert gas connections of the wave soldering installation.

2. The device of claim 1, wherein the heat exchangers are configure to immersed substantially completely in the solder bath next to other components of the wave soldering installation.

3. The device of claim 1 further comprising a transport device configured to transport printed circuit boards to be soldered, the transport device having a direction of movement, wherein the greatest dimension of the heat exchangers together is in the direction of movement such that the heat exchangers do not interfere with the transport device when the transport device is operational.

4. The device of claim 3, wherein the smallest dimension of the heat exchangers is transverse to the direction of movement and does not exceed a width of 5 cm.

5. The device of claim 4, wherein the smallest dimension of the heat exchangers is transverse to the direction of movement and does not exceed a width of 2.5 cm.

6. The device of claim 1, wherein at least three heat exchangers are present.

7. The device of claim 1, wherein the heat exchangers are in the form of pipe coils.

8. The device of claim 1, wherein the pipe coils comprise at least 1.5 windings within the solder bath.

9. The device of claim 1, wherein the cover can be detached when the inlets and outlets are not connected.

10. The device of claim 1, wherein two heat exchangers consist of a material that is resistant to the solder bath or are coated with said material.

11. The device of claim 10, wherein the material is titanium nitride or chromium nitride.

* * * * *